(12) United States Patent
Hankins et al.

(10) Patent No.: US 9,069,605 B2
(45) Date of Patent: *Jun. 30, 2015

(54) MECHANISM TO SCHEDULE THREADS ON OS-SEQUESTERED SEQUENCERS WITHOUT OPERATING SYSTEM INTERVENTION

(71) Applicant: Intel Corporation, Santa Clara, CA (US)

(72) Inventors: Richard A. Hankins, San Jose, CA (US); Hong Wang, Fremont, CA (US); Gautham N. Chinya, Hillsboro, OR (US); Trung A. Diep, San Jose, CA (US); Shivnandan D. Kaushik, Portland, OR (US); Bryant E. Bigbee, Scottsdale, AZ (US); John P. Shen, San Jose, CA (US); Asit K. Mallick, Santa Clara, CA (US); Baiju V. Patel, Portland, OR (US); James Paul Held, Portland, OR (US); Milind B. Girkar, Sunnyvle, CA (US); Prashant Sethi, Folsom, CA (US); Xinmin Tian, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,223

(22) Filed: Oct. 30, 2013

(65) Prior Publication Data

US 2014/0115594 A1   Apr. 24, 2014

Related U.S. Application Data

(63) Continuation of application No. 11/027,445, filed on Dec. 30, 2004, now Pat. No. 8,607,235.

(51) Int. Cl.
 *G06F 9/46* (2006.01)
 *G06F 9/48* (2006.01)

(52) U.S. Cl.
 CPC .................................. *G06F 9/4843* (2013.01)

(58) Field of Classification Search
 None
 See application file for complete search history.

(56) References Cited

U.S. PATENT DOCUMENTS

| 5,257,375 A | 10/1993 | Clark et al. |
| 5,428,781 A | 6/1995 | Duault et al. |

(Continued)

FOREIGN PATENT DOCUMENTS

| JP | 2004-280297 | 10/2004 |
| WO | 2006/074027 A2 | 7/2006 |
| WO | 2006/074027 A3 | 8/2006 |

OTHER PUBLICATIONS

State Intellectual Property Office, P.R. China, Office Action mailed May 23, 2012 in Chinese application. 200910222297.5.

(Continued)

*Primary Examiner* — Gregory A Kessler
(74) *Attorney, Agent, or Firm* — Trop, Pruner & Hu, P.C.

(57) ABSTRACT

Method, apparatus and system embodiments to schedule OS-independent "shreds" without intervention of an operating system. For at least one embodiment, the shred is scheduled for execution by a scheduler routine rather than the operating system. A scheduler routine may run on each enabled sequencer. The schedulers may retrieve shred descriptors from a queue system. The sequencer associated with the scheduler may then execute the shred described by the descriptor. Other embodiments are also described and claimed.

20 Claims, 9 Drawing Sheets

(56) References Cited

U.S. PATENT DOCUMENTS

| | | |
|---|---|---|
| 6,289,369 B1 | 9/2001 | Sundaresan |
| 6,434,590 B1 | 8/2002 | Blelloch et al. |
| 6,766,515 B1 | 7/2004 | Bitar et al. |
| 7,376,954 B2 | 5/2008 | Kissell |
| 7,451,146 B2 | 11/2008 | Boehm |
| 2003/0037089 A1 | 2/2003 | Cota-Robles et al. |
| 2003/0217090 A1 | 11/2003 | Chauvel et al. |
| 2004/0049580 A1 | 3/2004 | Boyd et al. |
| 2004/0215987 A1 | 10/2004 | Farkas et al. |
| 2005/0081203 A1 | 4/2005 | Aguilar et al. |
| 2006/0075404 A1 | 4/2006 | Rosu et al. |

OTHER PUBLICATIONS

State Intellectual Property Office, P.R. China, Third Office Action mailed Jul. 19, 2011 in Chinese application No. 200580045758.6.

Takao Moriyama, et al., "A Multiprocessor Resource Management Scheme Which Considers Program Grain Size," IPSJ Research Report, Jul. 18, 1999, pp. 108-108.

Japanese Patent Office, Notification of Reasons for Refusal dated Oct. 16, 2012 in Japanese patent application No. 2011-007496.

State Intellectual Property Office, P.R. China, Second Office Action issued Dec. 20, 2010 in Chinese patent application No. 200580045758.6.

International Preliminary Report on Patentability received for PCT Patent Application No. PCT/US2005/047334, mailed on Jul. 12, 2007, 7 pages.

Office Action Received for Chinese Patent Application No. 200580045758.6, mailed on Mar. 2, 2010, 17 pages of Chinese Office Action, including 9 pages of English Translation.

Office Action Received for European Patent Application No. 05855829.7, mailed on Sep. 26, 2007, 4 pages.

Office Action received for Korean Patent Application No. 2007-7017501, mailed on Nov. 2B, 2008, 3 pages of English translation.

Wang et al., "Helper Threads via Virtual Multithreading on an Experimental Itanium® 2 Processor-based Platform", In Proceedings of the 11th International Conference on Architectural Support for Programming Languages and Operating Systems (ASPLOS'04), Oct. 9-13, 2004, pp. 144-155.

Takao Moriyama et al., "A Multiprocessor Resource Management Scheme which Considers Program Grain Size", IPSJ Research Report, Information Processing Society of Japan (IPSJ), Jul. 18, 1990, vol. 90, No. 60, (National Academic Institution Article 2000-00160-017), pp. 103-108.

Office Action Received for Japanese Patent Application No. 2007-549606, mailed on May 11, 2010, 8 pages of Japanese Office Action, including 4 pages of English Translation.

Dai Honda et al., "An Efficient Caching Technique Using Speculative Threads on Hyper-Threading Technology", IPSJ Research Report, Information Processing Society of Japan (IPSJ), vol. 2004, No. 80(ARC-159), Jul. 31, 2004, pp. 43-48.

Deborah T. Marr et al., "Hyper-Threading Technology Architecture and Microarchitechture", Intel Technology Journal Q1, Intel Corporation, Feb. 14, 2002, vol. 6 Issue 1, pp. 4-15.

HP-UX Process Management, Version 1.3, Apr. 7, 1997.

"Nanothreads vs. Fibers for the Support of Fine Grain Parallelism on Windows NT/2000 Platforms", Barekas, et al., Lecture Notes in Computer Science, pp. 146-159.

PCT/US2005/047334 International Search Report and Written Opinion Mailed Jul. 6, 2006.

Agnihotri, P, et al., Nov. 7, 1998—The Penn State Computing Condominium Scheduling System Conference on Nov. 7-13, 1998, Piscataway, NJ.

Goel, S., et al., Oct. 15, 2003, "Destributed Schedular for High Performance Data-Centric Systems", IEEE Tencon 2003—Conference on Convergent Technologies for the Asia-Pacific Region-Bangalore, India—vol. 4 or 4 Conf. 18.

Chang-Qin Huang, et al.-Aug. 26, 2004—Intelligent Agent-Based Scheduling Mechanism for Grid Service-Machine Learning and Cybernetics, 2004; Proceedings of 2004 International Conference on Shanghai, China; Aug. 26-29.

MECHANISM TO SCHEDULE THREADS ON OS-SEQUESTERED SEQUENCERS WITHOUT OPERATING SYSTEM INTERVENTION

This application is a continuation of U.S. patent application Ser. No. 11/027,445, filed Dec. 30, 2004, the content of which is hereby incorporated by reference.

TECHNICAL FIELD

The present disclosure relates generally to information processing systems and, more specifically, to scheduling and control of thread execution on OS-sequestered sequencers without operating system intervention.

BACKGROUND

In order to increase performance of information processing systems, such as those that include microprocessors, both hardware and software techniques have been employed. On the hardware side, microprocessor design approaches to improve microprocessor performance have included increased clock speeds, pipelining, branch prediction, super-scalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, an operating system application may control scheduling and execution of the software threads. Typically, however, operating system control does not scale well; the ability of an operating system application to schedule threads without negatively impacting performance is commonly limited to a relatively small number of threads.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of an apparatus, system and method to schedule OS-sequestered threads for execution.

DETAILED DESCRIPTION

The following discussion describes selected embodiments of methods, systems and mechanisms to schedule and/or otherwise control threads of execution (referred to as "shreds") on one or more OS-sequestered sequencers. The OS-sequestered sequencers are sometimes referred to herein as "OS-invisible." The mechanisms described herein may be utilized with single-core or multi-core multithreading systems. In the following description, numerous specific details such as processor types, multithreading environments, system configurations, numbers and topology of sequencers in a multi-sequencer system, microarchitectural structures, and instruction nomenclature and parameters have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

A shared-memory multiprocessing paradigm may be used in an approach referred to as parallel programming. According to this approach, an application programmer may split a software program, sometimes referred to as an "application" or "process," into multiple tasks to be run concurrently in order to express parallelism for a software program. All threads of the same software program ("process") share a common logical view of memory.

Figure 1:
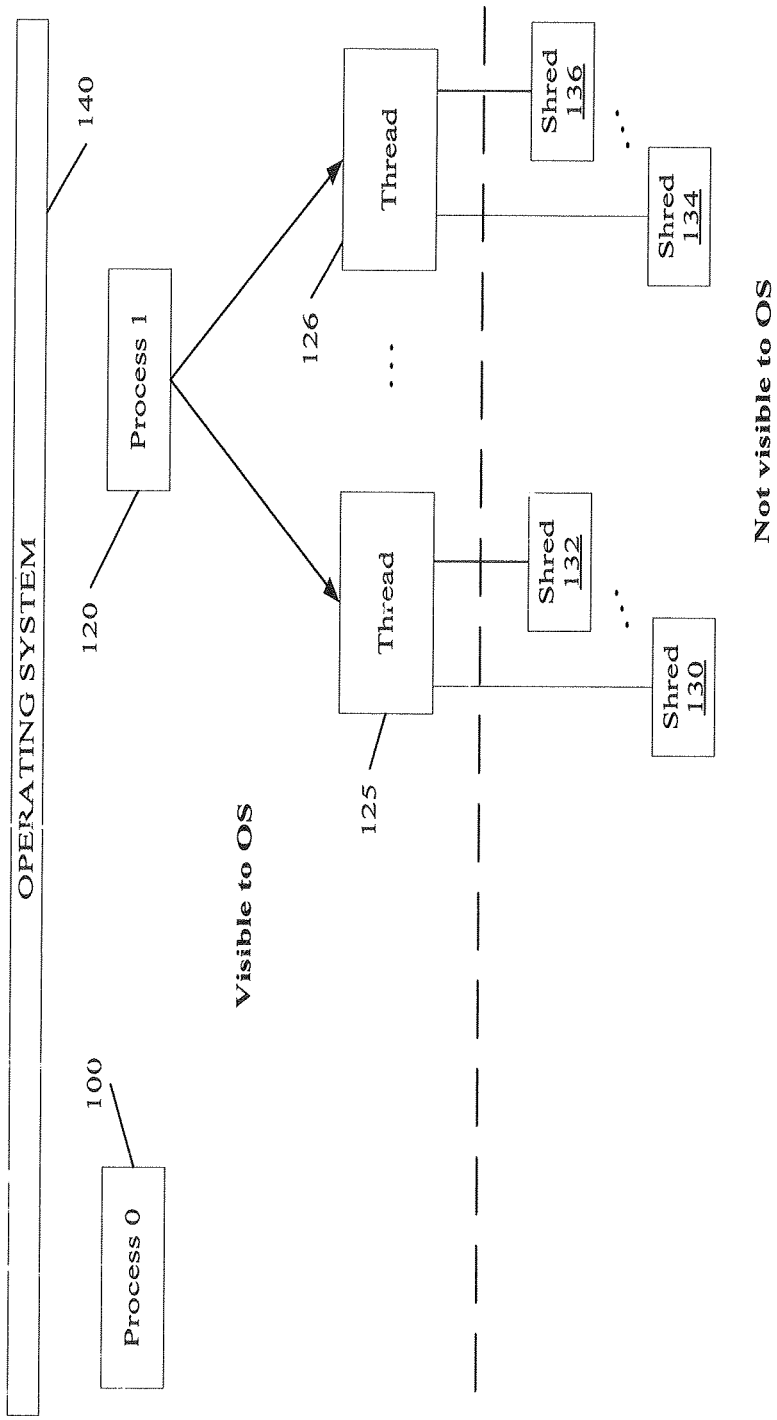
FIG. 1 is a block diagram presenting a graphic representation of a general parallel programming approach for a multi-sequencer system.

FIG. 1 is a block diagram illustrating a graphic representation of a parallel programming approach on a multi-sequencer multithreading system. FIG. 1 illustrates processes 100, 120 visible to an operating system 140. These processes 100, 120 may be different software application programs, such as, for example, a word processing program and an email management program. Commonly, each process operates in a different address space.

The operating system ("OS") 140 is commonly responsible for managing the user-created tasks for a process, such as process 120 illustrated in FIG. 1. Accordingly, the operating system 140 may create a distinct thread 125, 126 for each of the user-defined tasks associated with a process 120, and may map the threads 125, 126 to thread execution resources. (Thread execution resources are not shown in FIG. 1, but are discussed in detail below.) The OS 140 is commonly responsible for scheduling these threads 125, 126 for execution on the execution resources. The threads associated with a single process typically have the same view of memory and have visibility to each others' virtual address space.

Because the OS 140 is responsible for creating, mapping, and scheduling threads, the threads 125, 126 are "visible" to the OS 140. In addition, embodiments of the present invention comprehend additional threads 130-136 that are not visible to the OS 140. That is, the OS 140 does not create, manage, or otherwise acknowledge or control these additional threads 130-136. These additional threads, which are neither created nor controlled by the OS 140, are sometimes referred to herein as "shreds" 130-136 in order to distinguish them from OS-visible threads. The shreds are created and managed by user-level programs and are scheduled to run on sequencers that are sequestered from the operating system. The OS-sequestered sequencers share the same ring-0 state as OS-visible sequencers. Shreds thus share the same execution environment (address map) that is created for the threads associated with the same process.

As used herein, the terms "thread" and "shred" include, at least, the concept of a set of instructions to be executed concurrently with other threads and/or shreds of a process. The thread and "shred" terms both encompass the idea, therefore, of a set of software instructions. As used herein, a distinguishing factor between a thread (which is OS-controlled) and a shred (which is not visible to the operating system and is instead user-controlled), which are both instruction streams, lies in the difference of how execution of the thread and shred instruction streams is managed. A thread is generated in response to a system call to the OS. The OS generates that thread and allocates resources to run the thread. Such resources allocated for a thread may include data structures that the operating system uses to control and schedule the threads.

In contrast, at least one embodiment of a shred is generated via a user instruction or "primitive" that invokes a software library or other OS-independent mechanism for generating a shred that the OS is not aware of. A shred may thus be generated in response to a user-level software library call.

Figure 2:
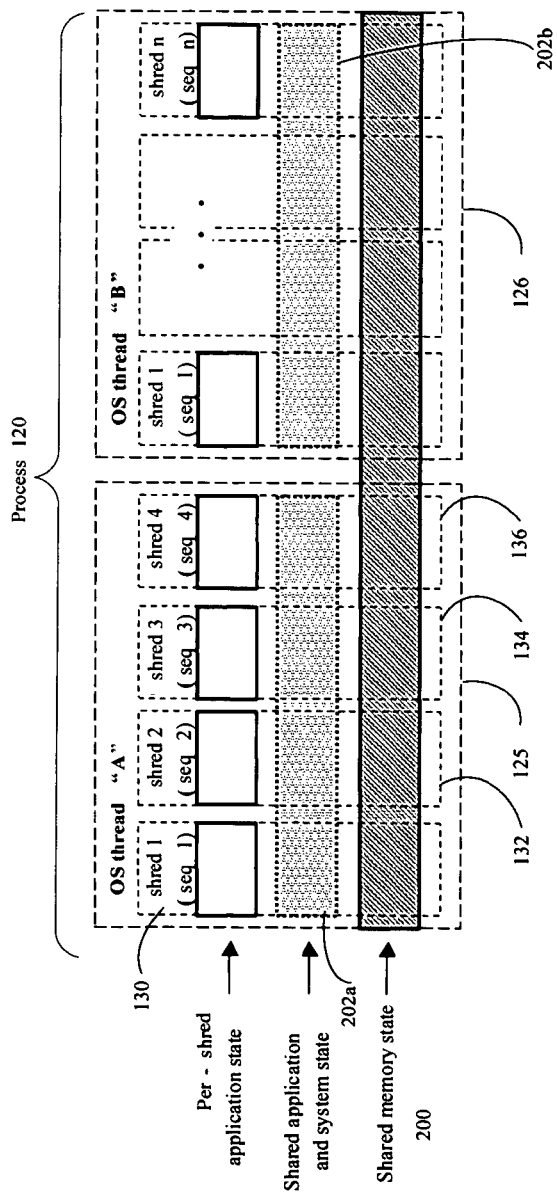
FIG. 2 is a block diagram illustrating shared memory and state among threads and shreds for at least one embodiment of user-level multithreading.

FIG. 2 is a block diagram illustrating, in graphical form, further detail regarding the statement, made above, that all threads of the same software program or process share a common logical view of memory. For embodiments of the present invention, this statement is also true regarding shreds associated with a process 100, 120. FIG. 2 is discussed herein with reference to FIG. 1.

FIG. 2 assumes the graphical representation of a process 120, threads 125, 126 and shreds 130-136 illustrated in FIG. 1. However, such representation should not be taken to be limiting. Embodiments of the present invention do not necessarily impose an upper or lower bound on the number of threads or shreds associated with a process. Regarding a lower bound, FIG. 1 illustrates that every process running at a given time need not necessarily be associated with any threads or shreds at all. For example, Process 0 100 illustrated in FIG. 1 is shown to run without threads nor shreds at the particular time illustrated in FIG. 1.

However, another process 120 may be associated with one or more threads 125, 126 as illustrated in FIG. 1. In addition, the process 120 may additionally be associated with one or more shreds 130-136 as well. The representation of two threads 125, 126 and four shreds 130-136 for a process 120 is illustrative only and should not be taken to be limiting. The number of OS-visible threads associated with a process may be limited by the OS program. However, the upper bound for the cumulative number shreds associated with a process is limited, for at least one embodiment, only by the number of thread execution resources available at a particular time during execution. FIG. 2 illustrates that a second thread 126 associated with a process 120 may have a different number (n) of threads associated with it than the first thread 125. (N may be 0 for either or both of the threads 125, 126.)

FIG. 2 illustrates that a particular logical view 200 of memory is shared by all threads 125, 126 associated with a particular process 120. FIG. 2 illustrates that each thread 125, 126 has its own application and system state 202a, 202b, respectively. FIG. 2 illustrates that the application and system state 202 for a thread 125, 126 is shared by all shreds (for example, shreds 130-136) associated with the particular thread.

Accordingly, FIG. 2 illustrates that a system for at least one embodiment of the present invention may support a 1-to-many relationship between an OS-visible thread, such as thread 125, and the shreds 130-136 (which are not visible to the OS) associated with the thread. The shreds are not "visible" to the OS (see 140, FIG. 1) in the sense that a programmer, not the OS, may employ user-level techniques to create, synchronize and otherwise manage and control operation of the shreds. While the OS 140 is aware of, and manages, a thread, the OS 140 is not aware of, and does not manage or control, shreds.

Thus, instead of relying on the operating system to manage the mapping between thread unit hardware and shreds, for at least one embodiment a user may directly control such mapping and may directly manipulate control and state transfers associated with shred execution. Accordingly, for embodiments of the methods, mechanisms and systems described herein, a user-visible feature of the architecture of the thread units is at least a canonical set of instructions that allow a user direct manipulation and control of thread unit hardware.

As used herein, a thread unit, also interchangeably referred to herein as a "sequencer", may be any physical or logical unit capable of executing a thread or shred. It may include next instruction pointer logic to determine the next instruction to be executed for the given thread or shred. For example, the OS thread 125 illustrated in FIG. 2 may execute on a sequencer, not shown, while each of the active shreds 130-136 may execute on other sequencers, "seq 1"-"seq 4", respectively. A sequencer may be a logical thread unit or a physical thread unit. Such distinction between logical and physical thread units is illustrated in FIG. 3.

Figure 3:
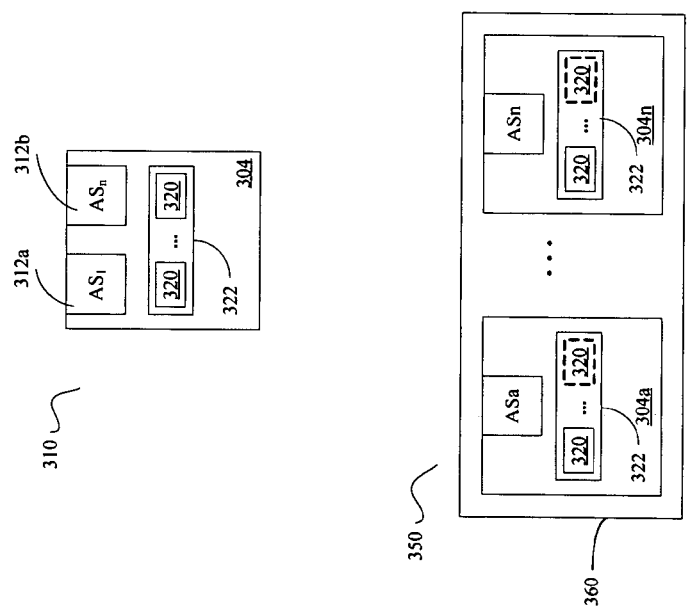
FIG. 3 is a block diagram illustrating various embodiments of multi-sequencer systems.

FIG. 3 is a block diagram illustrating selected hardware features of embodiments 310, 350 of a multi-sequencer system capable of performing disclosed techniques. FIG. 3 illustrates selected hardware features of an SMT multi-sequencer multithreading environment 310. FIG. 3 also illustrates selected hardware features of a multiple-core multithreading environment 350, where each sequencer is a separate physical processor core.

In the SMT environment 310, a single physical processor 304 is made to appear as multiple logical processors (not shown), referred to herein as LP.sub.1 through LP.sub.n, to operating systems and user programs. Each logical processor LP.sub.1 through LP.sub.n maintains a complete set of the architecture state AS.sub.1-AS.sub.n, respectively. The architecture state includes, for at least one embodiment, data registers, segment registers, control registers, debug registers, and most of the model specific registers. The logical processors LP.sub.1-LP.sub.n share most other resources of the physical processor 304, such as caches, execution units, branch predictors, control logic and buses. Although such features may be shared, each thread context in the multi-threading environment 310 can independently generate the next instruction address (and perform, for instance, a fetch from an instruction cache, an execution instruction cache, or trace cache). Thus, the processor 304 includes logically independent next-instruction-pointer and fetch logic 320 to fetch instructions for each thread context, even though the multiple logical sequencers may be implemented in a single physical fetch/decode unit 322. For an SMT or embodiment, the term "sequencer" encompasses at least the next-instruction-pointer and fetch logic 320 for a thread context, along with at least some of the associated architecture state, AS, for that thread context. It should be noted that the sequencers of an SMT system 310 need not be symmetric. For example, two SMT sequencers for the same physical core may differ in the amount of architectural state information that they each maintain.

Thus, for at least one embodiment, the multi-sequencer system 310 is a single-core processor 304 that supports concurrent multithreading. For such embodiment, each sequencer is a logical processor having its own instruction next-instruction-pointer and fetch logic and its own architectural state information, although the same physical processor core 304 executes all thread instructions. For such embodiment, the logical processor maintains its own version of the architecture state, although execution resources of the single processor core may be shared among concurrently-executing threads.

FIG. 3 also illustrates at least one embodiment of a multi-core multithreading environment 350. Such an environment 350 includes two or more separate physical processors 304a-304n that is each capable of executing a different thread/shred such that execution of at least portions of the different threads/shreds may be ongoing at the same time. Each processor 304a through 304n includes a physically independent fetch unit 322 to fetch instruction information for its respective thread or shred. In an embodiment where each processor 304a-304n executes a single thread/shred, the fetch/decode unit 322 implements a single next-instruction-pointer and fetch logic 320. However, in an embodiment where each processor 304a-304n supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment 350 is denoted by dotted lines in FIG. 3.

Thus, for at least one embodiment of the multi-core system 350 illustrated in FIG. 3, each of the sequencers may be a processor core 304, with the multiple cores 304a-304n residing in a single chip package 360. Each core 304a-304n may be either a single-threaded or multi-threaded processor core. The chip package 360 is denoted with a broken line in FIG. 3 to indicate that the illustrated single-chip embodiment of a multi-core system 350 is illustrative only. For other embodiments, processor cores of a multi-core system may reside on separate chips.

For ease of discussion, the following discussion focuses on embodiments of the multi-core system 350. However, this focus should not be taken to be limiting, in that the mechanisms described below may be performed in either a multi-core or single-core multi-sequencer environment.

Figure 4:
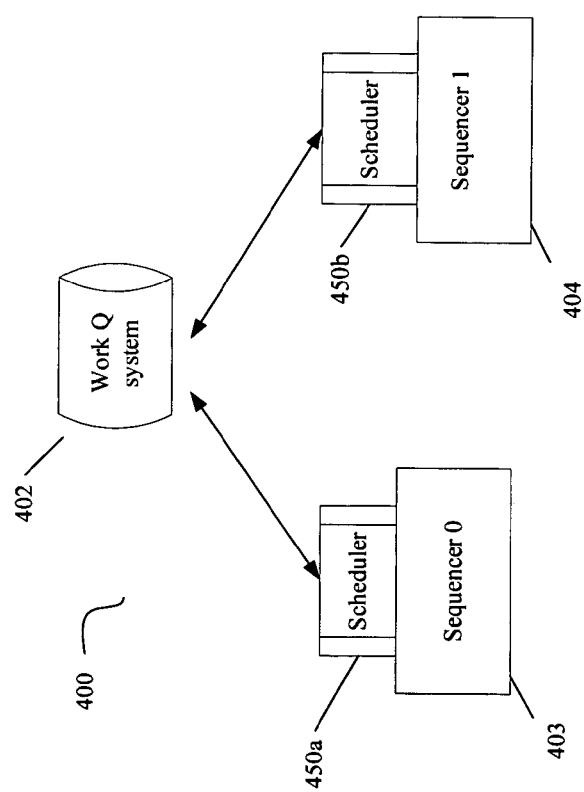
FIG. 4 is a data flow diagram illustrating at least one embodiment of a scheduling mechanism for a multi-sequencer multithreading system that supports user-level thread control.

FIG. 4 is a data flow diagram illustrating at least one embodiment of a scheduling mechanism 400 for a multi-sequencer multithreading system that supports user-level thread control. FIG. 4 illustrates that the mechanism 400 includes a work queue system 402. The mechanism also includes a scheduler routine 450, which may execute on each of multiple sequencers 403, 404.

The work queue system 402 may maintain, for at least one embodiment, descriptors for user-defined shreds that are in line for execution are therefore "pending". As is stated above, the scheduling mechanism 400 may be employed rather than an OS-provided scheduling mechanism; each work descriptor describes a shred that is to be executed, independent of OS intervention, on either an OS-sequestered or OS-visible sequencer.

Shred descriptors may be created by user-level shred creation instructions or primitives. One of skill in the art will recognize that there may be several levels of abstraction between the programmer's code and actual architectural instructions that cause a sequencer to perform actions resulting in the generation of shred descriptors and placement of the descriptors into a work queue 402. As used herein, an instruction described as being generated by a programmer or user is intended to encompass not only architectural instructions that may be generated by an assembler or compiler based on user-generated code, or by a programmer working in an assembly language, but also any high-level primitive or instruction that may ultimately be assembled or compiled into architectural shred control instructions. It should also be understood that an architectural shred control instruction may be further decoded by a thread execution unit into one or micro-operations.

FIG. 4 further illustrates that the scheduler routine 450a, 450b for each of the sequencers may access the work queue system 402 in order to obtain a shred for execution on the associated sequencer 403, 404. Thus, FIG. 4 illustrates at least one embodiment of a scheduling mechanism that allows user-level mapping and control of shreds, which may be executed concurrently with each other and/or with OS-controlled threads, without OS intervention for scheduling of the shreds.

It should be noted that the sequencers 403, 404 illustrated in FIG. 4 need not be symmetric, and their number should not be taken to be limiting. Regarding the number of sequencers, the scheduling mechanism 400 may be utilized for any number of sequencers. For example, the scheduling mechanism may be implemented for a multi-sequencer system that includes four, eight, sixteen, thirty-two or more sequencers.

Regarding symmetry, the sequencers 403, 404 may differ in any manner, including those aspects that affect quality of computation. For example, the sequencers may differ in terms of power consumption, speed of computational performance, functional features, or the like. By way of example, for one embodiment, the sequencers 403, 404 may differ in terms of functionality. For example, one sequencer may be capable of executing integer and floating point instructions, but cannot execute a single instruction multiple data ("SIMD") set of instruction extensions, such as Streaming SIMD Extensions 3 ("SSE3"). On the other hand, another sequencer may be capable of performing all the instructions that the first sequencer can execute, and can also execute SSE3 instructions.

As another example of functional asymmetry, for an embodiment of the present invention, one sequencer may be visible to the OS (see, for example, 140 of FIG. 1) and may therefore be capable of performing "ring-0" operations such as performing system calls, servicing a page fault, and the like. On the other hand, another sequencer may be sequestered from the OS, and therefore be incapable of performing ring-0 operations.

The sequencers of a system on which the scheduling mechanism 400 is utilized may also differ in any other manner, such as dimensions, word and/or data path size, topology, memory, power consumption, number of functional units, communication architectures (multi-drop vs. point-to-point interconnect), or any other metric related to functionality, performance, footprint, or the like.

Figure 5:
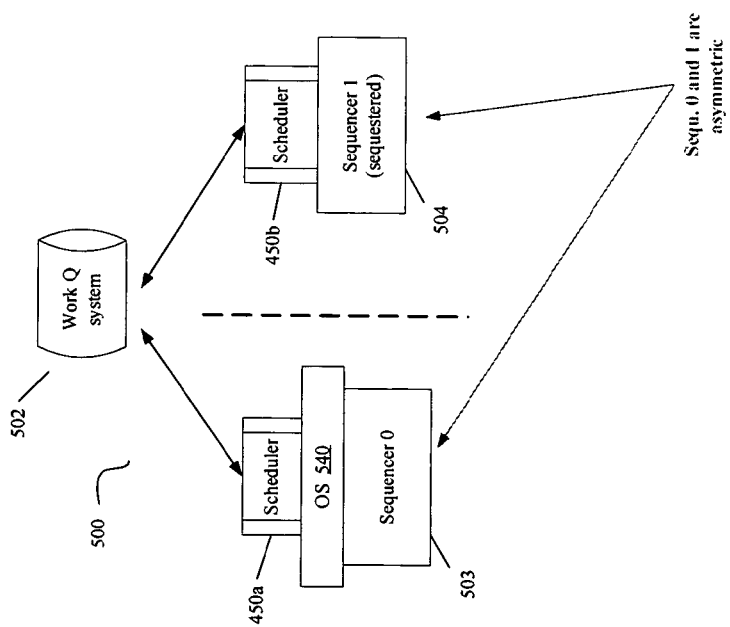
FIG. 5 is a data flow diagram illustrating at least one embodiment of a scheduling mechanism for an asymmetric multi-sequencer multithreading system.

FIG. 5 is a data flow diagram illustrating at least one embodiment of a scheduling mechanism 500 for an asymmetric multi-sequencer multithreading system. FIG. 5 illustrates just one embodiment of asymmetry, in that a first sequencer 503 is visible to an operating system 540 while a second sequencer 504 is sequestered from the operating system 540. Again, one of skill in the art will recognize that other types of asymmetry may be present in the system, and that more than two sequencers may be present in the system.

FIG. 5 illustrates that the scheduler routine 450a, 450b for each of the OS-visible sequencer 503 and the sequestered sequencer 504 probes the work queue system 502 for shreds to be executed on the sequencer 503, 504 associated with the scheduler instance 450a, 450b, respectively. Again, such mechanism 500 provides for scheduling of shreds on asymmetric sequencers without intervention of an operating system 540.

Figure 6:
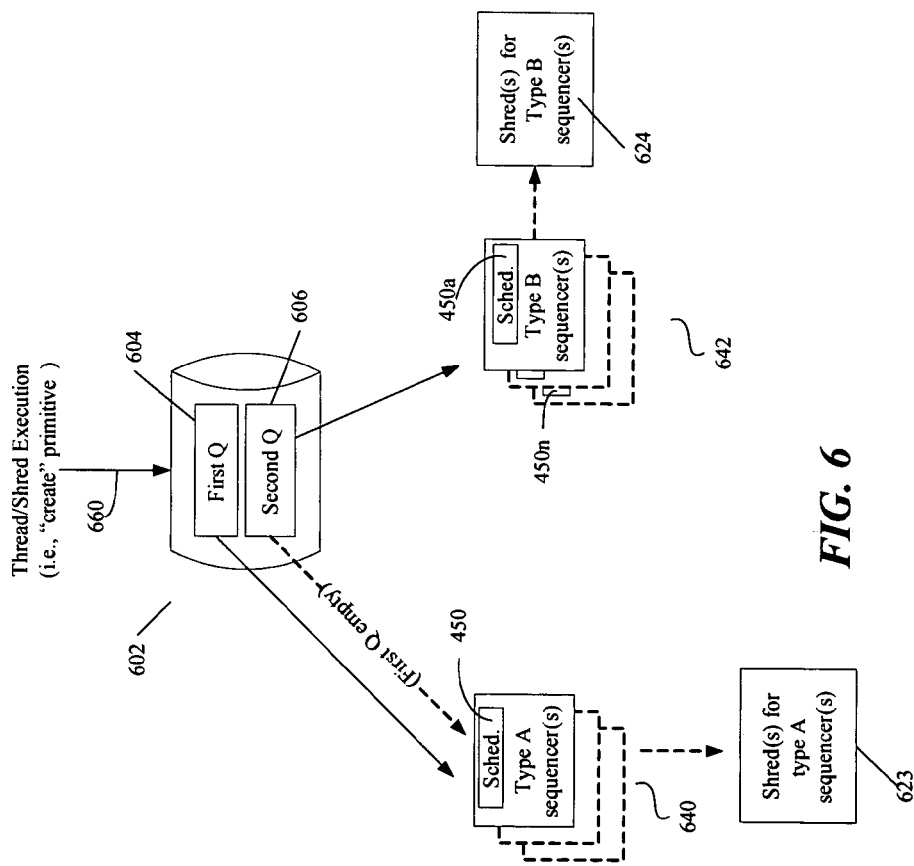
FIG. 6 is a data flow diagram illustrating at least one embodiment of a scheduling mechanism that includes multiple work queues.

FIG. 6 is a data flow diagram illustrating further detail for at least one embodiment of a scheduling mechanism 600 for an asymmetric multi-sequencer multithreading system. FIG. 6 illustrates that a work queue system 602 may include multiple work queues 604, 606. For at least one embodiment, each of the multiple work queues 604, 606 is associated with a sequencer type. For the sample embodiment illustrated in FIG. 6, a first queue 604 is associated with a set of one or more of a first type of sequencer 640, referred to herein as "Type A". A second queue 606 is associated with a set of one or more of a second type of sequencer 642, referred to herein as "Type B". As with the other embodiments illustrated in previous figures, the number of queues and sequencer types, as well as number of sequencers of each type as illustrated in FIG. 6 should not be taken to be limiting.

FIG. 6 illustrates, therefore, a scheduling mechanism 600 for a system that includes at least two types of asymmetric sequencers—Type A sequencers 640 and Type B sequencers 642. The queue system 602 includes a work queue 604, 606 associated with each type of sequencer. Each sequencer 640, 642 includes a portion of a distributed scheduler routine 450. The portions 450a, 450b may be identical copies of each other, but need not necessarily be so.

FIG. 6 illustrates that the first queue 604 may include shred descriptors for shreds 623 to run on the type A sequencers 640. The second queue 606 may include shred descriptors for shreds 624 to run on the type B sequencers 642. The type A shreds 623 may be software sequences written by a user to take advantage of particular functionality provided by the type A sequencers 640. Similarly, the type B shreds 624 may be software sequences written by a user to take advantage of particular functionality provided by the type B sequencers 642.

For at least one embodiment, the functionality of type A and type B sequencers may be mutually exclusive. That is, for example, one set of sequencers 640 may support a particular functionality, such as execution of SSE3 instructions, that the other set of sequencers 642 does not support; while another set of sequencers 642 may support a particular functionality, such as ring-0 operations, that the other set of sequencers 640 does not support.

For such embodiment, the scheduling mechanism 600 may operate such that descriptors for a first type of shred 623 may be pulled from the first queue 604 by the scheduler routine 450 on a type A sequencer 640, while descriptors for a second type of shred 624 may be pulled from the first queue 604 by the scheduler routine 450 on a type A sequencer 640. The mapping of shreds to an appropriate sequencer may be directed by user-level instructions.

However, for at least one other embodiment, such as the embodiment illustrated in FIG. 6, the functionality of sequencer types A 640 and B 642 represent a superset-subset functionality relationship rather than a mutually exclusive functionality relationship. That is, a first set of sequencers (such as type A sequencers 640) provide a superset of functionality that includes all functionality of a second set of sequencers (such as type B sequencers 642), plus additional functionality that is not provided by the second set of sequencers 642. For such embodiment, the shred descriptors from the second queue 606 may be optionally retrieved by the scheduler routine 450 for the type A sequencers 640. This optional processing may be performed, for example, if all descriptors for the type A sequencers are unavailable (such as, for example, if the first queue 604 is empty). In other words, the sequencers with superset functionality may execute shreds specifically designated for such sequencers, but may also execute shreds designated for sequencers of subset functionality.

Finally, FIG. 6 illustrates that shred descriptors may be placed 660 into the work queue system 602 responsive to shred creation instructions executed by another shred or by a shred-aware thread. For at least one embodiment, the instructions that trigger creation of shred descriptor are API-like ("Application Programmer Interface") thread control primitives such as shred_create. Software, such as that provided by a software library, may create, responsive to a shred_create primitive, a shred descriptor for the new shred and may place it into the work queue system 602.

For at least one embodiment, a shred descriptor is thus created by software responsive to a shred_create primitive and is placed into the queue system 702. The shred descriptor may be, for at least one embodiment, a record that identifies at least the following properties for a shred: a) the address at which the shed should begin execution and b) a stack descriptor. The stack descriptor identifies the memory storage area (stack) to be used by the new shred to store temporary variables, such as local variables and return addresses.

Figure 7:
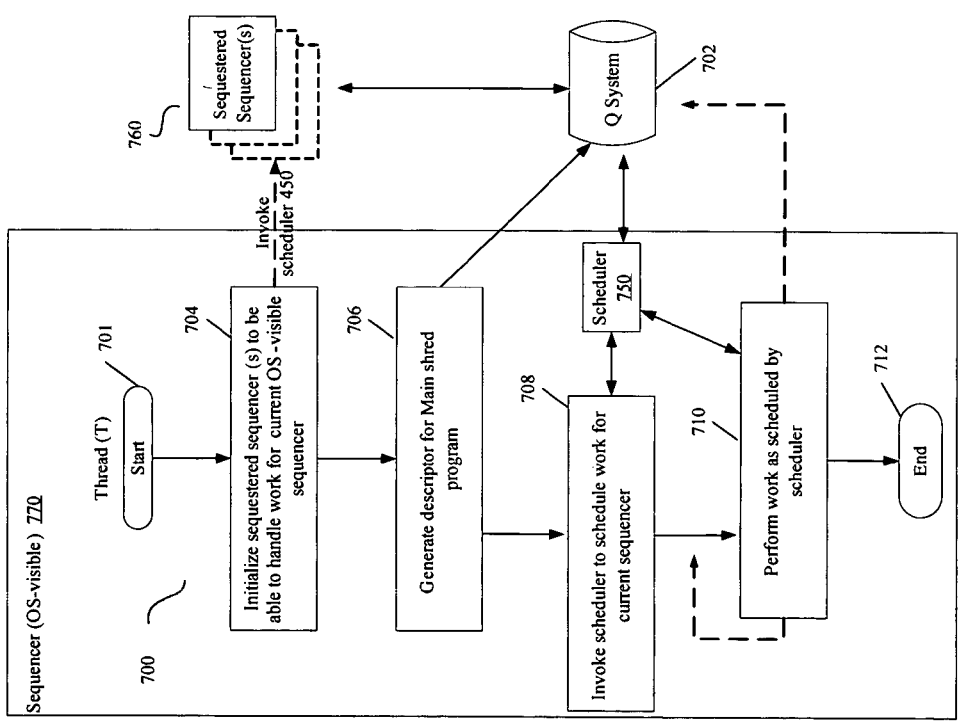
FIG. 7 is a timing diagram illustrating at least one embodiment of control flow for user-driven OS-independent scheduling of shreds.

FIG. 7 is a data flow diagram illustrating a sample sequence for utilizing an embodiment of a scheduling mechanism, such as any of those illustrated in FIGS. 4-6, to perform user-level scheduling of shreds for execution on a multi-sequencer system. For at least one embodiment, a method 700 is performed by a thread, T, running on a sequencer 770. For at least one embodiment, the method 700 is performed responsive to instructions generated by a user, such as a programmer. For FIG. 7, such instructions are referred as instructions of a thread, T. It will be understood, of course, that the blocks of the method 700 may be programmed by a user in a different sequence than that shown in FIG. 7.

FIG. 7 illustrates a sample embodiment of a multi-sequencer system wherein the sequencers are asymmetric with respect to a functional metric. That is, the sequencer 770 on which the thread T is executed is an OS-visible sequencer. As such, the sequencer 770 may, via interaction with the operating system, perform privileged operations, such as ring-0 operations (i.e., service page faults, perform system calls, etc.) In contrast, the sample embodiment illustrated in FIG. 7 also includes sequestered sequencers 760 that are not visible to the OS. As such, the sequestered sequencers 760 are not able to perform the privileged operations. They may, for example, be limited to performing ring-3 operations but cannot perform ring-0 operations. FIG. 7 thus illustrates a sample embodiment of a multi-sequencer system that includes asymmetric sequencers.

For the embodiment illustrated in FIG. 7, the method 700 begins at block 701 and proceeds to block 704. At block 704, the thread, T, executes one or more instructions to perform initialization for user-level control of one or more concurrent shreds associated with thread T. For at least one embodiment, such initialization 704 may include creation and/or initialization of one or more queues (see, e.g., 604 and 606 of FIG. 6) of a work queue system 702.

In addition, FIG. 7 illustrates that such initialization 704 may include initialization of one or more sequestered sequencers 760. One of skill in the art will recognize, of course, that the queue creation and sequencer initialization illustrated at block 704 need not necessarily be performed by a single routine, method, or function, nor need they necessarily be performed in the sequential order discussed herein. For an alternative embodiment, for example, the initialization actions taken at block 704 may be performed in the opposite order, or may be performed concurrently.

The sequencer initialization of block 704 may be performed in order to prepare the sequestered sequencer(s) 760 to run shreds as indicated by user-generated shred creation instructions placed into the instruction stream for thread T by a user, such as a computer programmer. For at least one embodiment, such sequencer initialization may include the invocation of the distributed scheduler routine 450 on each of the sequestered sequencers 760. As is discussed in further detail below, invocation of the scheduler routine 450 may result in execution of a scheduling loop, wherein each portion of the distributed scheduler begins to periodically check the work queue system 702 for work that may be performed by the associated sequestered sequencer 760.

Without such initialization 704, it is anticipated for at least one embodiment that the sequestered sequencer(s) 760 are not available to execute shreds. For at least one embodiment, the initialization 704 that prepares a sequencer 760 to execute shreds includes, at least, invocation of a scheduler routine 450. The initialization 704 may be performed for each sequencer indicated by a user in the instruction stream for thread T. For at least one embodiment, all sequencers initialized for execution by the thread T shared the same view of virtual memory that is constructed by the operating system for the process with which thread T is associated.

Processing proceeds from block 704 to block 706. At block 706, the thread, T, generates a shred descriptor for execution beginning at a user-defined main-shred function. For at least one embodiment, the user-defined main-shred function replaces a traditional OS-visible main( ) function. FIG. 7 illustrates that the shred descriptor for the main-shred may be placed into a work queue system 702. Accordingly, the main-shred is placed in line to be scheduled for execution by one of the distributed shred scheduler routines 450 at the next opportunity.

From block 706, processing proceeds to block 708. At block 708, the OS-visible thread T begins its own scheduling loop. Accordingly, thread T executes one or more instructions to initialize a scheduler routine 750 on sequencer 770. FIG. 7 illustrates that scheduler 750 may consult the work queue system 702 to schedule work on the first sequencer 770. FIG. 7 thus illustrates an embodiment wherein all shred descriptors are sent to a common queue system 702 from which all scheduler routines 450a-450n, 550 can request and schedule work. Because instances of the scheduling routine 450a-450n are distributed among multiple sequestered sequencers, the scheduling routine 450 may be referred to herein as a "distributed" scheduler.

For at least one embodiment, the OS-visible sequencer 770 (a first type) is associated with a first work queue of the queue system 702 (see, e.g., 604 of FIG. 6) while the sequestered sequencers (a second type) are associated with a second work queue of the queue system 702 (see, e.g., 606 of FIG. 6). As is explained above in connection with FIG. 6, for at least one embodiment the first sequencer 770 may pull work from any queue in the work queue system 702.

In this manner, both the OS-visible sequencer 770 and the one or more sequestered sequencers 760 have been initialized 704, 706 to be capable of executing of shreds based on user-generated instructions rather than relying on an OS to manage such scheduling. As illustrated, at least one mechanism for doing so is to invoke a scheduler routine 450 on the initialized (see block 704) sequestered sequencers 760 as well invoking a more common OS-visible scheduler routine 750 on the sequencer 770 that is to generate the shred descriptor for the main-shred routine (see block 708). From block 708, processing proceeds to block 710.

At block 710, the sequencer 770 executes instructions as scheduled on the sequencer 770 by its scheduler 750. The nature of block 710 may be iterative, in that multiple shred or thread portions may be executed sequentially on the sequencer 770. The potentially iterative nature of block 710 processing is denoted in FIG. 7 with a broken line.

The sequencer 770 may execute shred instructions as indicated by the shred descriptors in the queue of the work queue system 702 that is associated with its sequencer type. Such instructions may include those that cause additional shred descriptors to be generated and placed into the work queue system 702.

For at least one embodiment, shreds that are executed by sequencer 770 may include those that require functionality provided by the sequencer type of 770, which cannot be performed by the sequestered sequencers 760. For the example illustrated in FIG. 7, for instance, the queue associated with sequencer 770 may include shred instructions that require ring-0 operations. That is, operating system calls executed by a shred may require special handling because the OS can only service system calls issued from an OS-visible sequencer. System calls for shreds running on the OS-sequestered sequencers 760 may be executed by an OS-visible sequencer 770 via proxy mechanism.

The proxy mechanism that allows an OS-visible sequencer to impersonate a shred in order to get the attention of the operating system to make forward progress for a privileged instruction. The proxy mechanism may be implemented in any number of manners. For example, such mechanism may be invoked implicitly when a sequestered sequencer 760 attempts to perform a privileged instruction, such as a system call, on an OS-sequestered sequencer. The attempted system call may cause an exception to be generated. The handler for the exception may save the shred state, generate a shred descriptor for the system call, and place the shred descriptor in the queue associated with the OS-visible sequencer 702. When such descriptor is scheduled for execution 710 on the OS-visible sequencer 770, the sequencer 770 may save its own state before obtaining the shred's state and executing the system call. For such proxy execution, the execution on the OS-visible sequencer 770 resumes at instruction that caused the fault on the OS-sequestered sequencer 760. The shred's state is then saved, and control is returned to the faulting OS-sequestered sequencer 760 so that it may continue execution of its shred.

For at least one other embodiment, the proxy execution for privileged instructions may be explicitly controlled by the user. For such embodiment, the user may explicitly indicate that a shred that includes a privileged instruction should be executed on an OS-visible sequencer 770. Such indication may be expressed as a parameter, or variant, of a shred creation primitive. The inclusion of a queue preference parameter, or the use of a specialized shred creation primitive, are both collectively referred to herein as scheduling hints.

A shred creation primitive (such as, for example, "shred_create( )") primitive may invoke a library function. The function may cause creation of a new shred descriptor and may further cause placement of the descriptor into a queue of the work queue system 702. An optional parameter of the standard shred_create( ) primitive may allow the user to specify a queue type for the descriptor. Alternatively, an optional function call, referred to herein as shred_create_affinity( ) may be utilized by the user to express a queue preference for the particular shred. For example, if the shred consists of a large number of system calls, the user may specify a work queue associated with a sequencer type capable of performing ring-0 operations. One of skill in the art will recognize that similar parameter and/or alternative parameter approaches may also be utilized with a yield primitive.

The system illustrated in FIG. 7 may include additional safeguards related to the handling of system calls. For example, a mutex may be utilized to provide serialization around OS calls. The mutex may be utilized to minimize deadlock that could otherwise occur if a thread and one or more of its associated shreds attempt to acquire the same lock provided by the operating system for thread synchronization.

For any shred, or shred portion, executed at block 710, the sequencer 770 may continue execution of the shred until an exit or yield primitive is executed. If an "exit" primitive is encountered in the current shred, execution of the current shred is complete and the scheduler 750 may prod an appropriate queue of the queue system 702 to schedule another sequence of instructions for execution on the sequencer 770. For at least one embodiment, the exit instructions thus marks the shred as being complete and control returns back to the scheduler 750.

If a "yield" primitive is encountered in the current shred, a shred descriptor for the calling process may be placed back into the queue system and control returned to the scheduler 750. Accordingly, upon execution of a "yield" primitive, a shred descriptor for the remaining shred instructions for the current shred may be placed into the work queue system 702.

For either the exit or yield case, after execution of a current shred has completed at block 710, processing may end at block 712. Alternatively, a new thread or shred may be scheduled for execution. Accordingly, the broken line looping from block 710 back to block 710 indicates that additional threads or shreds may be executed by the sequencer 770. After execution of all threads and/or shreds (or shred portions) as scheduled by the distributed scheduler 750 is complete, processing may end at block 712.

Regarding scheduling of additional shreds after execution of block 710, a new shred may be scheduled for execution, by the distributed scheduler 750, on the current sequencer 770 after the yield or end instruction has been executed. For at least one embodiment, such action occurs as a result of the scheduler 750 obtaining work from a work queue associated with a sequencer type other than its own.

Alternatively, additional OS-visible instructions may be executed after block 710. Such work may be scheduled from a work queue associated with the sequencer's 770 own sequencer type. As is described above, for at least one embodiment the sequencer's 770 scheduler 750 only schedules shreds originally designated to execute on OS-sequestered sequencers if its own queue is empty.

Figure 8:
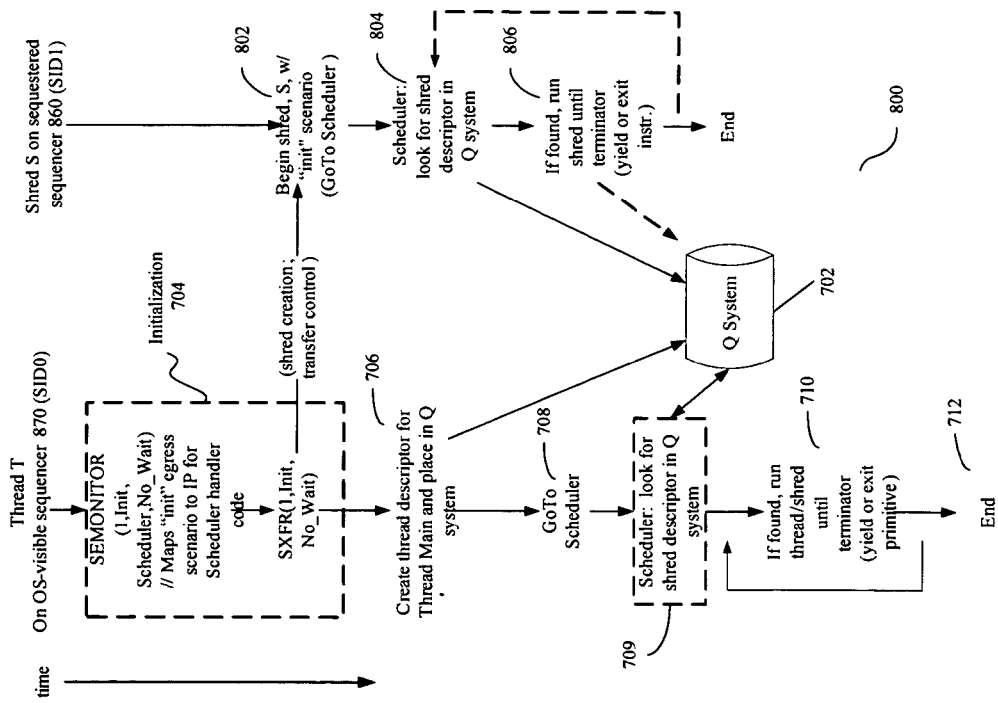
FIG. 8 is a timing diagram illustrating at least one embodiment of control flow for a specific example of user-driven OS-independent scheduling of shreds.

FIG. 8 is a timing diagram illustrating at least one embodiment of control flow for OS-independent scheduling of shreds. For purposes of illustration, the timing diagram of FIG. 8 illustrates control flow for a specific example of the method embodiment 700 illustrated in FIG. 7. Accordingly, FIG. 8 is discussed below with reference to FIG. 7. As is illustrated in FIG. 7, the method 800 illustrated in FIG. 8 may be performed by a first OS-visible sequencer (870) and a second, sequestered, sequencer (860).

FIG. 8 illustrates further detail for at least one embodiment of initialization 704 (see FIG. 7) on a first sequencer 870 of a first type. For at least one embodiment, the sequencer 870 is distinguished from the second sequencer 860 in terms of a functional metric. That is, the first sequencer 870 is OS-visible, while the second sequencer 860 is sequestered.

FIG. 8 illustrates that the initialization 704 may include execution of at least two user-generated instructions. The first instruction, referred to herein as a shred monitor ("SEMONITOR") instruction, is used to set up a channel for communication between an OS-visible sequencer and an OS-sequestered sequencer. A second initialization instruction is a control transfer instruction, referred to herein as a shred transfer ("SXFR") instruction.

One of skill in the art will recognize that the methods 700, 800 and systems described herein need not be limited to any particular nomenclature or instruction set architecture for shred control instructions. One of skill in the art will also recognize that the SEMONITOR- and SXFR-type instructions may be generated, as a result of a compiler, assembler, or library function, for a primitive, such as shred_create( ) shred_create_affinity( ) shred_yield( ) and shred_exit( ) discussed above. In this sense, the ultimate instructions are nonetheless referred to herein "user-generated", although they may have been generated responsive to a higher-level user construct. The foregoing partial list of shred primitives should not be taken to be limiting.

One of skill in the art should also recognize that the appended claims encompass embodiments wherein the ultimate shred control instructions are not necessarily hardware-supported instructions. Instead, for at least one embodiment, the "instructions" generated in response to the primitives may be, instead of architectural instructions, hardware signals. The signals, such as interrupts or other sequencer control signals, may be generated by a software or firmware layer in response to user-generated primitives in order to implement SEMONITOR- and SXFR-type functionality.

Instead, the methods 700, 800 generically assume that the sequencers 870, 860 support architectural, user-level instructions for generating and controlling shred and that traditional multithreading API's may be fully implemented using the canonical shred instruction set. For further discussion of one sample set of canonical shred instructions, one may refer to copending patent application U.S. patent application Ser. No. 11/173,326, filed Jun. 30, 2005, entitled "A Mechanism For Instruction Set-Based Thread Execution on a Plurality of Instruction Sequencers."

For at least one embodiment, it is assumed that the sequencers 870, 860 support at least a canonical set of shred instructions, which includes instructions along the lines of SEMONITOR and SXFR. The capability of a user to utilize this type of instruction to control the operation of multiple sequencers and, in particular, to effect inter-sequencer transfer of control, is referred to herein as "sequencer arithmetic." The shred instructions that provide for sequencer arithmetic may be utilized as building blocks to construct higher-level shredding primitives, such as fork, join, yield, exit, lock, wait, and unlock, to name a few. These primitives may be utilized to allow user-level management of concurrent shared-memory shreds that execute without OS-level scheduling. In this manner, the canonical shred instructions may be utilized to build an abstraction layer between the architectural shred instructions and application software. The canonical shred instructions may thus be utilized to build an abstraction layer that supports legacy application program interfaces.

Generally, the SXFR-type instructions may, when executed by a first sequencer, send a signal from the first sequencer to a second sequencer. The SXFR-type instruction therefore provides a mechanism to perform inter-shred signaling for service. The action of an SXFR-type instruction is synchronous, in the sense that the user can control, by judiciously placing the SXFR-type instruction into code, the timing of the execution of the SXFR instruction in relation to execution of other instructions in the shred instruction stream.

In contrast, the SEMONITOR-type instruction provides for asynchronous sequencer arithmetic. The SEMONITOR-type instructions may be used by the programmer to configure a second sequencer to monitor for a signal from the first sequencer.

FIG. 8 illustrates that the first initialization instruction, the SEMONITOR instruction, maps on the specified target sequencer a handler routine to a specific event type. That is, the embodiment of the SEMONITOR instruction illustrated in FIG. 8 maps the beginning instruction pointer address for a particular routine (here, the beginning of the distributed scheduler routine, "Scheduler",) to an event type, "init" for the specified sequencer id, 1. The result, on the target sequencer, of execution of the SEMONITOR instruction on the first sequencer is that the target sequencer monitors the indicated event indicator and begins a flow of control on the target sequencer at the designated address.

The event type may be implemented for at least one embodiment as an indicator, such as a signal line that becomes activated when the specified event is indicated by the first sequencer. As a result of execution of the SEMONITOR instruction on the first sequencer SID0 870, the target sequencer, SID1 860, as identified by the "1" as the sequencer identifier parameter of the SEMONITOR instruction, polls or otherwise monitors the "init" event indicator. When the init indicator is activated, SID1 860 jumps to the specified address (that is, to the beginning of the scheduler routine) and begins execution of the scheduler code. The Scheduler routine is merely used as an example in FIG. 8; one of skill in the art will recognize that any appropriate event-handler code may be utilized. Execution of the SEMONITOR instruction may thus set up an asynchronous control transfer to occur on the specified sequencer.

The SEMONITOR initialization illustrated in FIG. 8 is specific to the example illustrated in FIG. 8, and should not be taken to be limiting. A set of several initialization instructions, similar to the SEMONITOR instruction illustrated in FIG. 8, may be performed for alternative embodiments in order to map a series of event types to specific handler routines. After execution of the SEMONITOR instruction illustrated in FIG. 8, event type "init" is associated with the distributed scheduler.

A second initialization instruction, the SXFR instruction, is then executed by the first sequencer 870. Execution of the SXFR instruction sends an event to initialize a separate thread of execution on the OS-sequestered sequencer SID1. At 802, when the OS-sequestered sequencer SID1 detects the signal containing the "Init" scenario, the OS-sequestered sequencer SID1 starts a thread S, and commences execution of an instruction stream corresponding to the distributed scheduler (see, e.g., 450 of FIG. 7).

FIG. 8 illustrates an embodiment of the SXFR instruction that includes the following parameters: a sequencer identifier, an event type, and an optional synchronization flag. The sequencer identifier ("SID") specifies the sequencer to which control is to be transferred as a result of execution of the SXFR instruction. For the example illustrated in FIG. 8, the sequencer identifier for sequencer 870 is "SID0" and the sequencer identifier for sequencer 860 is "SID1."

The event type parameter for the SXFR instruction illustrated in FIG. 8 indicates an "init" event type. As a result of prior execution of the SEMONITOR instruction illustrated in Fig., the "init" event type has been associated with the distributed scheduler (450, FIG. 7) at the time that the SXFR instruction is executed. Accordingly, the event type parameter effectively indicates to the transferee sequencer (that is, to SID1 860), that is should begin execution at the IP address for the distributed scheduler when the sequencer 860 begins execution.

The final parameter of the sample SXFR instruction illustrated in FIG. 8 is an optional wait/no wait flag. By specifying "no wait", the instruction essentially begins a concurrent multithreading situation—the first sequencer 870 need not wait for a synchronization indicator from the transferee sequencer 860, but may continue with execution of its own instruction stream as soon as it has completed execution of the SXFR instruction.

The SXFR instruction is thus a shred creation and control transfer instruction. FIG. 8 illustrates that, as a result of the first sequencer's execution of the SXFR instruction, a shred S begins executing the distributed handler routine on the second sequencer 860. After execution of the SXFR instruction, therefore, thread T and shred S may execute concurrently.

Execution of thread T on SID0 870 may continue execution after it has executed the SXFR instruction at 704, due to the "no wait" flag. Accordingly, thread T goes on to create 706 a shred descriptor for a "main-shred" program and to place such descriptor in the work queue system 702. As is discussed above in connection with FIG. 7, a main-shred descriptor may be placed into a work queue system 702 (FIG. 2), where the queue is associated with the sequestered sequencer SID1 860.

Thread T then invokes 708 its OS-visible scheduler 750, and goes on to execute instructions 710 as directed by its scheduler 750. As is discussed above in connection with FIG. 7, the thread T may optionally look for shred descriptors 709, and may therefore execute shred instructions at 710, at least for those embodiments that a) permit the OS-visible scheduler to pull work from the OS-sequestered sequencer queue and/or b) that support proxy execution of shred instructions on the OS-visible sequencer 870. After executing one or more iterations of instruction execution 710, processing for the thread T may end at 712.

Regarding the sequestered sequencer 860, FIG. 8 illustrates at least one embodiment of a sequence of operations to be performed for a shred, S. As is discussed above, a scheduling loop (i.e., execution of the distributed scheduler 450)

may be initiated on the sequencer 860 as a result of initialization processing 704 performed by the OS-visible thread, T, executing on the OS-visible sequencer SID 870.

At 804, the scheduler routine 450 running on SID1 860 queries the work queue system 702 to determine if there are any shred descriptors available for execution by the sequencer 860. For the sample sequence illustrated in FIG. 8, the sequencer SID1 860 may encounter the main-shred descriptor at block 806, if block 706 (discussed above) has already been performed by SID0 870.

If a descriptor is found, the sequencer 860 executes 806 the shred indicated by the descriptor. The shred is executed until a) completion or b) a yield instruction is encountered.

It should be noted that instructions of a shred may include additional shred creation instructions. That is, for at least one embodiment, a shred may itself perform at least two types of shred operations: shred control operations (related to creating and terminating shreds) and synchronization operations (such as a yield operation). (For at least one embodiment, such operations may be invoked by a user's use of an industry standard-compliant primitive in the shred instruction stream. One such industry standard, for example, is POSIX (Portable Operating System Interface).) A broken line from 806 to the work queue system 702 in FIG. 8 illustrates that additional shred descriptor(s) may be created during execution 806 of a shred, and that the additional descriptor(s) may be placed into the work queue system 702.

For example, a yield primitive may be placed into the shred instruction stream by the user. Such yield primitive may cause the sequencer to yield control of the shred. In so doing, the sequencer 860 may place a descriptor for the remainder of the shred instructions back into the work queue system 702 prior to terminating execution of the shred. A yield primitive may invoke a function that swaps the stack before performing transfer of control, such that the current thread context is saved before returning control to the sequencer's scheduler.

FIG. 8 illustrates that execution of the shred, S, on SID1 860 is terminated or suspended when a termination instruction (exit, yield, etc.) is executed. At such time, distributed scheduler 450 may optionally probe the work queue system 702 for another shred descriptor in order to identify work that may be performed by sequencer SID1 860. Such optional iterative probe of the work queue system 702 is indicated in FIG. 8 by the broken arrow from 806 to 804.

For the example illustrated in FIG. 8, it should be noted that it is possible that the scheduler routine 450 running on SID1 860 may likely find the shred descriptor for the "main-shred" routine before the scheduler routine 450 running on SID0 870 probes the work queue system 702. In such case, assuming that either sequencer 860, 870 is capable of executing the "main-shred" routine, the "main-shred" routine may be executed by SID1 860, even though its descriptor was created by SID0 870.

It will be apparent from the foregoing discussion of FIG. 8 that, for at least one embodiment, the two illustrated sequencers 860, 870 are both capable of performing the "main-shred" routine. Accordingly, it may be assumed that, for at least one embodiment, the sequencers 860, 870 are symmetric. For at least one other embodiment, however, the sequencers 860, 870 are not fully symmetric, but each sequencer 860, 870 nonetheless has sufficient functional capability to execute the main-shred routine. Such embodiment may exist, for example, where the main-shred routine requires only ring-3 capability, sequencer SID1 860 has ring-3 capability, and SID0 870 has both ring-3 and ring-3 capability. For such embodiment, as illustrated in FIG. 6, the work queue system 702 may include a first queue (for descriptors that can only be performed by SID0 870, for example) and a second queue for descriptors that can be performed by either SID0 870 or SID1 860.

Regarding the distributed scheduler 450 and the work queue system 702, for at least one embodiment, the work queue system 702 may be protected by a critical section. As is discussed above, each sequestered sequencer 860 may effectively run its own copy of a portion of the distributed the scheduler routine 450 and attempt to contend access to the head of a queue of the task queue system 702 to process the next ready instruction to run its associated sequencer. Should one task on a sequencer be waiting for a synchronization variable such as mutex, a conditional variable, or a semaphore, the task may be de-scheduled and put at the tail of the a task queue after entering the corresponding critical section.

Given the example illustrated in FIG. 8, it can be seen that embodiments of the present invention are capable of scheduling threads of execution on sequencers that are sequestered from the OS, without using an OS. Thus, by virtue of the techniques disclosed herein it is possible to build a multi-sequencer system with more sequencers than an OS has the ability to support and to allow user-level scheduling of threads on sequencers of the multi-sequencer system that are not supported by the OS.

For at least some embodiments of the mechanisms, systems, and methods described above, a distributed scheduler 450 operates as an event-driven self-scheduler where shreds are created in response to queued scheduling events that are created as a result of API-like thread control (shred_create, shred_create affinity, and the like) or thread synchronization (shred_yield and the like) primitives. The scheduler and primitives may be implemented as part of a run-time library that creates an intermediate layer of abstraction between a traditional industry standard API, such as a POSIX-compliant API, and the hardware of a multi-sequencer system wherein the sequencers support at least a canonical set of shred instructions that implement user-level sequencer arithmetic. The library may include a scheduler, such as an embodiment of the distributed scheduler 450 discussed above. The run-time library may act as an intermediate level of abstraction so that a programmer may utilize a traditional thread API (such as, for instance, Pthreads API or Win32 Threads API) with hardware that supports shredding. The library may provide functions that transparently invoke the canonical shred instructions, based on user-programmed primitives.

The scheduling mechanism and techniques discussed herein may be implemented on any multi-sequencer system, including a single-core SMT system (see, e.g., 310 of FIG. 3) and a multi-core system (see, e.g., 350 of FIG. 3). Further discussion of such systems is discussed below in connection with FIG. 9.

Figure 9:
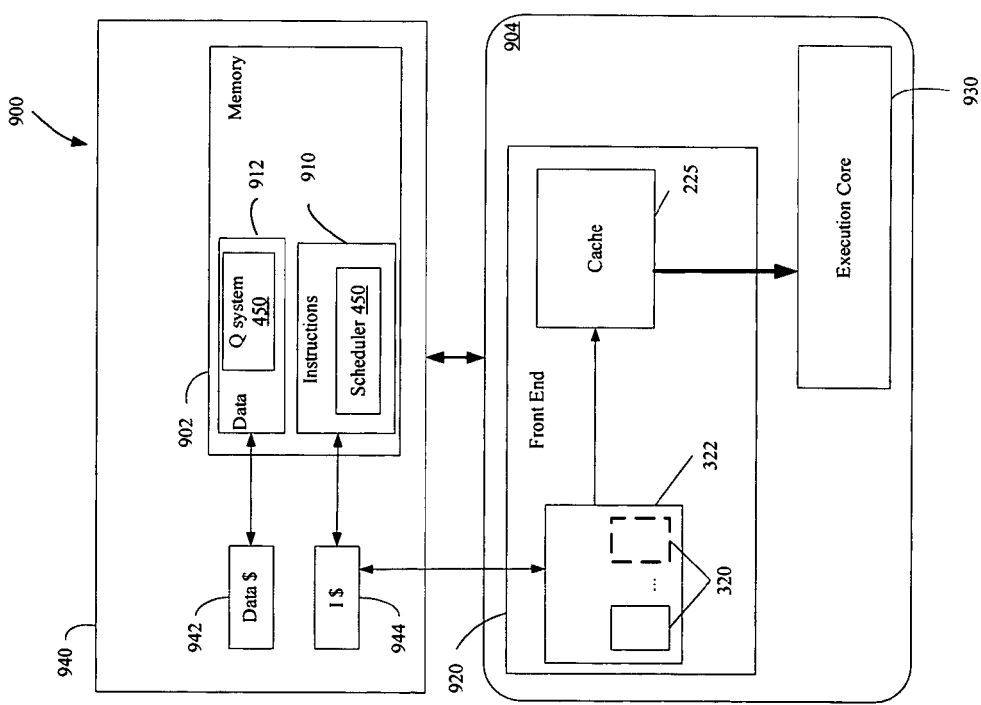
FIG. 9 is a block diagram illustrating at least one embodiment of a system capable of performing disclosed techniques.

FIG. 9 illustrates at least one sample embodiment of a computing system 900 capable of performing disclosed techniques. The computing system 900 includes at least one processor core 904 and a memory system 940. Memory system 940 may include larger, relatively slower memory storage 902, as well as one or more smaller, relatively fast caches, such as an instruction cache 944 and/or a data cache 942. The memory storage 902 may store instructions 910 and data 912 for controlling the operation of the processor 904. The instructions 910 may include one or more copies of the distributed scheduler routine 450.

Memory system 940 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 940 may store instructions 910 and/or data 912 represented by data signals that may be executed by processor 904. The instructions 910 and/or data 912 may include code and/or data for performing any or all of the techniques discussed herein. For example, the data 912 may include one or more queues to form a queue system 702 capable of storing shred descriptors as described above. Alternatively, the instructions 910 may include instructions to generate a queue system 702 for storing shred descriptors.

The processor 904 may include a front end 920 that supplies instruction information to an execution core 930. Fetched instruction information may be buffered in a cache 225 to await execution by the execution core 930. The front end 920 may supply the instruction information to the execution core 930 in program order. For at least one embodiment, the front end 920 includes a fetch/decode unit 322 that determines the next instruction to be executed. For at least one embodiment of the system 900, the fetch/decode unit 322 may include a single next-instruction-pointer and fetch logic 320. However, in an embodiment where each processor 904 supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment is denoted by dotted lines in FIG. 9.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general- or special-purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Sample system 900 is representative of processing systems based on the Pentium™, Pentium™ Pro, Pentium™ II, Pentium™ III, Pentium™ 4, and Itanium™ and Itanium™ 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims. For example, the work queue system 702 may include a single queue that is contended by multiple sequencer types. For such embodiment, resource requirements are expressly included in each shred descriptor. Each sequencer's portion of the distributed scheduler does a check to make sure that the sequencer is capable of executing a shred before the shred's descriptor is removed from the work queue for execution by the sequencer.

For another alternative embodiment, a hybrid approach may be implemented in the work queue system 702. For such hybrid approach, the work queue system 702 includes multiple queues. Nonetheless, one or more of the queues corresponds to multiple sequencer types. For such hybrid embodiment, an express resource indication is included in each shred descriptor for any queue that is associated with more than one sequencer type.

The distributed scheduler routine discussed above may schedule execution of shred descriptors using a round-robin scheduling approach. However, for at least one alternative embodiment, the distributed scheduler and work queue system discussed above may support a priority-based scheduling scheme. Also, for at least one alternative embodiment, queue preferences for a multi-queue queue system embodiment can be set by the user, or by the run-time library, to direct that tasks are executed by a preferred sequencer. For example, a shred that is executed on a particular sequencer before a yield operation may be sent back to that same particular sequencer when remaining instructions of the shred are executed.

Regarding dispatch of shred descriptors into the work queue system, it has been described above in connection with FIG. 7 that assignment of shred descriptors may be expressly controlled statically by a user's use of a particular parameter or particular "affinity" primitive in order to define, at the time a shred is created, which queue is should be assigned to.

For at least one alternative embodiment, dynamic assignment may be utilized instead of, or in addition to, such static assignment approaches. Dynamic assignment may be implemented through a user-level synchronization object, such as a mutex. Such mutex may allow a shred to dynamically self-schedule a spawnee shred into a particular queue of the work queue system. Alternatively, dynamic assignment may be implemented such that the distributed scheduler observes the behavior of the queues and dynamically selects which queue should receive a descriptor. Also alternatively, dynamic assignment may be performed through the programmer's use of synchronization primitives, such as "lock" and "unlock" primitives. Such primitives may utilize OS mutex constructs. Upon execution of a lock primitive, the current sequencer may execute a yield operation and place the descriptor for the current shred into a queue corresponding to the mutex.

Accordingly, one of skill in the art will recognize that changes and modifications can be made without departing from the present invention in its broader aspects. The appended claims are to encompass within their scope all such changes and modifications that fall within the true scope of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A multi-core processor comprising:
   a first sequencer of a first sequencer type to execute one or more threads and including a first portion of a distributed user-level scheduler;
   a second sequencer of a second sequencer type to execute one or more shreds and including a second portion of the distributed user-level scheduler, wherein the first sequencer is visible to an operating system (OS) and the second sequencer is invisible to the OS, the first and second sequencers being computationally asymmetric; and
   a work queue coupled to the first sequencer and the second sequencer, the work queue to store a descriptor for each of one or more pending shreds, and wherein the first sequencer and the second sequencer are to determine whether the corresponding sequencer is capable of execution of a shred of the one or more pending shreds, and if so, to remove the corresponding descriptor from the work queue for execution of the shred by the corresponding sequencer.

2. The multi-core processor of claim 1, wherein the first and second portions are further to query the work queue to contend for the descriptor, wherein the work queue includes a first queue to store descriptors for the first sequencer and a second queue to store descriptors for the second sequencer, and wherein the second portion is to schedule, invisible to the OS, the shred for execution on a selected one of the first and second sequencers, based on the contention.

3. The multi-core processor of claim 2, wherein the first sequencer is to initialize the second sequencer to perform user-level concurrent multithreading, including to trigger execution, on the second sequencer, of the second portion of the distributed user-level scheduler.

4. The multi-core processor of claim 1, wherein the descriptor comprises an address at which the shred is to begin execution and a stack descriptor to identify a memory storage area.

5. The multi-core processor of claim 1, wherein a user-level program is to create and manage the one or more shreds.

6. The multi-core processor of claim 5, wherein the user-level program includes a first instruction to cause a descriptor for a new thread to be stored in the work queue.

7. The multi-core processor of claim 1, wherein the second sequencer is configured to execute integer and floating point instructions.

8. The multi-core processor of claim 7, wherein the first sequencer is configured to execute single instruction multiple data instructions.

9. The multi-core processor of claim 1, wherein the work queue comprises a first queue associated with the first sequencer, and a second queue associated with the second sequencer.

10. The multi-core processor of claim 9, wherein the first sequencer is to retrieve a descriptor from the second queue if the first queue is empty.

11. The multi-core processor of claim 1, wherein the second sequencer is to incur an exception in response to attempted performance of a privileged instruction, and the first sequencer is to execute the privileged instruction in proxy for the second sequencer.

12. A method comprising:
    executing a user-generated thread primitive;
    generating, by a first core of a multi-core processor, the first core visible to an operating system (OS) and a second computation unit of the multi-core processor invisible to the OS, responsive to the user-generated thread primitive, a descriptor to describe a thread including a beginning address for execution of the thread and a stack descriptor to identify a memory storage area;
    storing the descriptor in a work queue, wherein the work queue includes a first queue associated with the first core and a second queue associated with the second computation unit; and
    scheduling execution of the thread on the second computation unit using a distributed user-level scheduler invoked on the first core and the second computation unit.

13. The method of claim 12, further comprising initializing the second computation unit to perform user-level concurrent multithreading.

14. The method of claim 13, wherein the initializing further comprises triggering execution, on the second computation unit, of the distributed user-level scheduler.

15. The method of claim 12, wherein the first core and the second computation unit are asymmetric with respect to at least one of a functional metric, a power consumption metric, and the ability to perform ring-0 operations.

16. The method of claim 12, further comprising querying, by the first core and the second computation unit, the work queue to contend for the descriptor, and scheduling, invisible to the OS, the thread for execution on a selected one of the first core and the second computation unit, based on the contention.

17. At least one non-transitory computer-readable medium comprising instructions that when executed enable a system to:
    execute a user-generated thread primitive;
    generate, by a first core of a multi-core processor, the first core visible to an operating system (OS) and a second computation unit of the multi-core processor invisible to the OS, responsive to the user-generated thread primitive, a descriptor to describe a thread including a beginning address for execution of the thread and a stack descriptor to identify a memory storage area;
    store the descriptor in a work queue, wherein the work queue includes a first queue associated with the first core and a second queue associated with the second computation unit; and
    schedule execution of the thread on the second computation unit using a distributed user-level scheduler invoked on the first core and the second computation unit.

18. The at least one non-transitory computer-readable medium of claim 17, further comprising instructions that when executed enable the system to initialize the second computation unit to perform user-level concurrent multithreading.

19. The at least one non-transitory computer-readable medium of claim 17, further comprising instructions that when executed enable the system to trigger execution, on the second computation unit, of the distributed user-level scheduler.

20. The at least one non-transitory computer-readable medium of claim 17, wherein the first core and the second computation unit are asymmetric with respect to at least one of a functional metric, a power consumption metric, and the ability to perform ring-0 operations.

* * * * *